United States Patent
Livengood et al.

(10) Patent No.: US 6,357,317 B1
(45) Date of Patent: Mar. 19, 2002

(54) STEERING COLUMN

(75) Inventors: Greg Livengood, Greenfield; David Koellisch; Timothy Lowney, both of Lafayette, all of IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/595,854

(22) Filed: Jun. 16, 2000

(51) Int. Cl.$^7$ ................................................. B62D 1/18
(52) U.S. Cl. .......................................... 74/493; 280/775
(58) Field of Search ............................. 74/293; 280/775

(56) References Cited

U.S. PATENT DOCUMENTS

| | | | |
|---|---|---|---|
| 4,449,419 A | | 5/1984 | Bruguera |
| 4,507,982 A | * | 4/1985 | Turner et al. .................. 74/493 |
| 5,131,287 A | | 7/1992 | Stromberg |
| 5,606,891 A | * | 3/1997 | Tisell et al. .................... 74/493 |
| 6,237,438 B1 | * | 5/2001 | Rhouma et al. ............... 74/493 |

* cited by examiner

Primary Examiner—David A. Bucci
Assistant Examiner—William C. Joyce
(74) Attorney, Agent, or Firm—Tarolli, Sundheim, Covell, Tummino & Szabo L.L.P.

(57) ABSTRACT

A steering column (10) having a steering column member (12) connectable with a steering wheel (16). A support (24) supports the steering column member (12) for rotation about a longitudinal axis of the steering column member. A mounting bracket (50) connects the steering column (10) with a vehicle frame. The mounting bracket (50) has side walls (60, 62) extending generally parallel to each other. The side walls (60, 62) have slots (66, 68) extending generally parallel to each other. A pivot shaft (74) pivotally connects the support with the mounting bracket (50). The pivot shaft (74) extends through the support (24) and the slots (66, 68) in the side walls (60, 62). The pivot shaft (74) is movable along the slots (66, 68) relative to the mounting bracket (50). A locking mechanism (82) locks the support (24) in any one of a plurality of pivot positions relative to the mounting bracket (50) and locks the pivot shaft (74) in any one of a plurality of positions along the slots (66, 68) relative to the mounting bracket. The locking mechanism (82) has a locking shaft (84) extending through the support (24) and the slots (66, 68).

6 Claims, 3 Drawing Sheets

STEERING COLUMN

FIELD OF THE INVENTION

The present invention relates to a steering column and, more specifically, to an adjustable steering column.

BACKGROUND OF THE INVENTION

A known steering column is disclosed in U.S. Pat. No. 5,131,287. U.S. Pat. No. 5,131,287 discloses a bearing housing supporting a steering column member for rotation. A mounting bracket connects the steering column with a vehicle frame. A spindle pivotally connects the bearing housing with the mounting bracket. The spindle extends through the bearing housing and a slot in the mounting bracket. The spindle is movable along the slot in the mounting bracket. A locking mechanism locks the bearing housing in a pivot position relative to the mounting bracket and locks the spindle in position along the slot in the mounting bracket. The locking mechanism has a bolt that extends through the bearing housing and another slot in the mounting bracket.

SUMMARY OF THE INVENTION

The present invention is a steering column having a steering column member connectable with a steering wheel. A support supports the steering column member for rotation about a longitudinal axis of the steering column member to turn steerable vehicle wheels. A mounting bracket connects the steering column with a vehicle frame. The mounting bracket has first and second side walls extending generally parallel to each other. The first side wall has a first slot and the second side wall has a second slot extending generally parallel to the first slot.

A pivot shaft pivotally connects the support with the mounting bracket. The pivot shaft extends through the support and the first and second slots in the first and second side walls of the mounting bracket. The pivot shaft is movable along the first and second slots relative to the mounting bracket.

A locking mechanism locks the support in any one of a plurality of pivot positions relative to the mounting bracket. The locking mechanism also locks the pivot shaft in any one of a plurality of positions along the first and second slots relative to the mounting bracket. The locking mechanism has a locking shaft extending through the support and the first and second slots in the first and second side walls of the mounting bracket.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
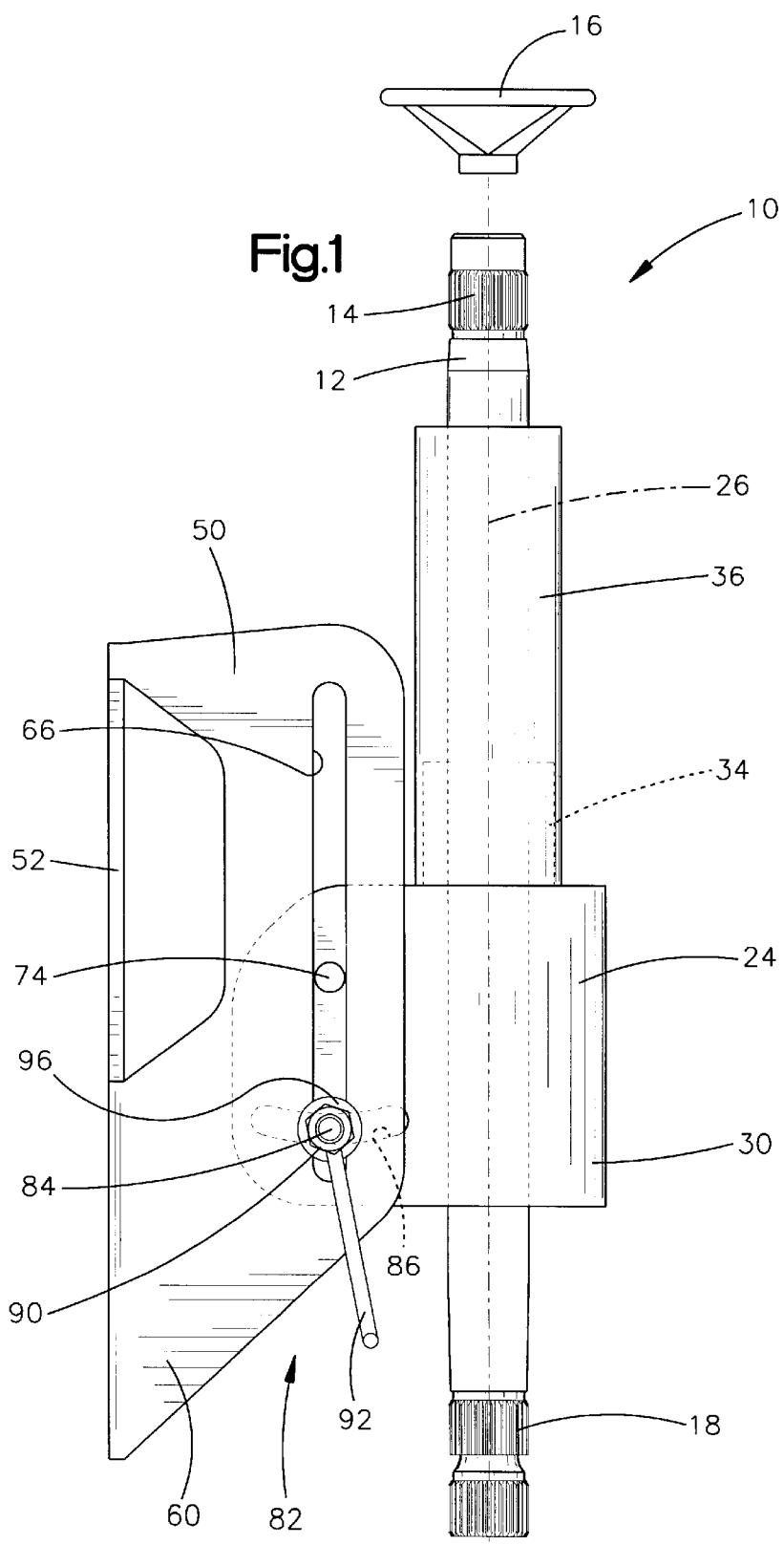
FIG. 1 is a schematic side view of a steering column of the present invention in a first position.
Figure 2:
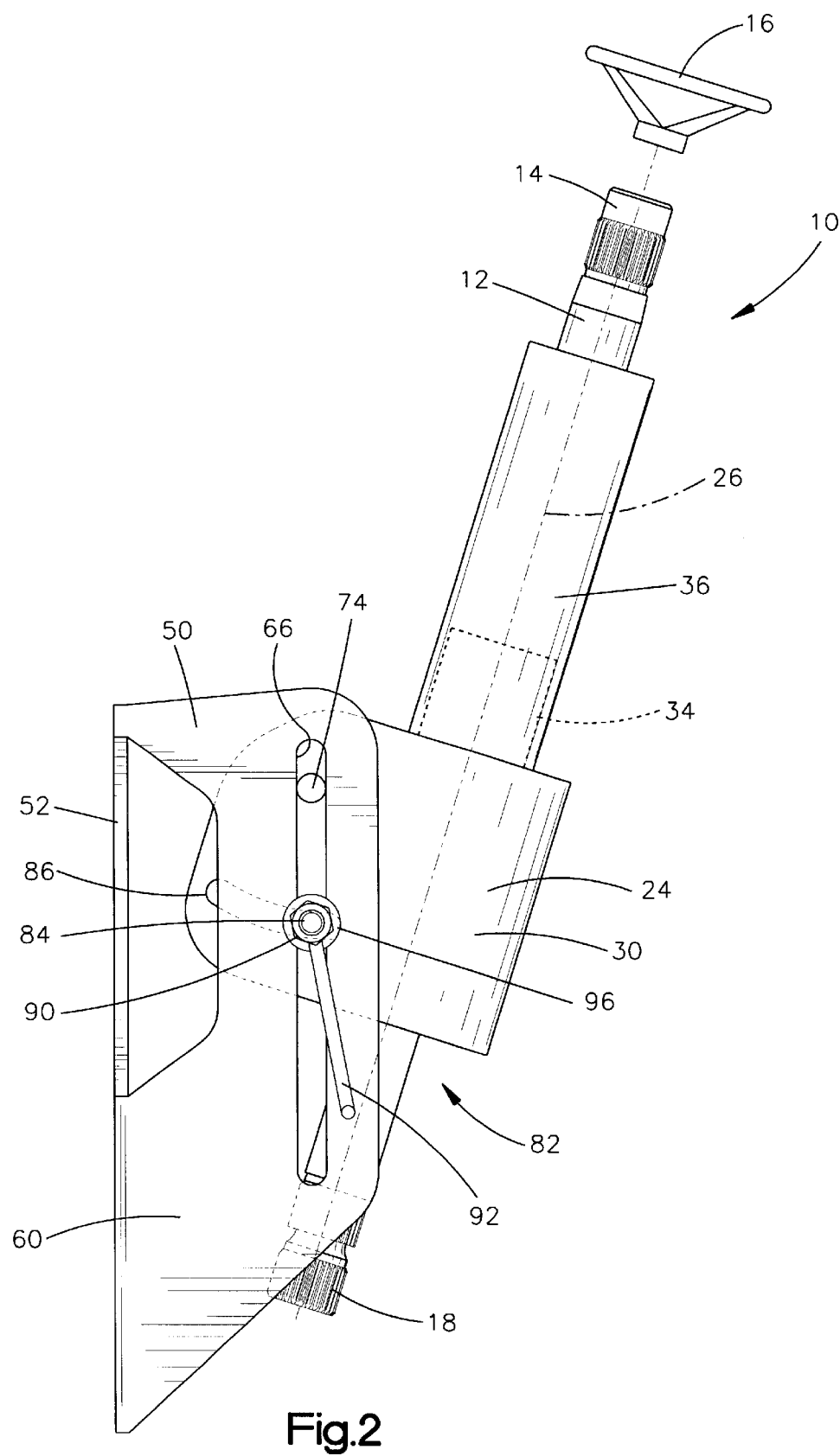
FIG. 2 is a view similar to FIG. 1 showing the steering column in a second position.

The present invention comprises an adjustable vehicle steering column 10 (FIGS. 1 and 2). The steering column 10 includes a rotatable steering column member 12. The steering column member 12 has an end 14 connectable with a steering wheel 16 in a manner known in the art. An end 18 of the steering column member 12, opposite from the end 14, is connectable with a universal joint (not shown). The universal joint connected with the end 18 of the steering column member 12 is connected with a mechanism (not shown) designed to transmit movement of the steering column member 12 to a steering gear and permit movement of the steering column member 12 relative to the mechanism.

A support 24 supports the steering column member 12 for rotation about a longitudinal axis 26 of the steering column member. Upon rotation of the steering wheel 16, the steering column member 12 rotates about the longitudinal axis 26. Upon rotation of the steering column member 12 about the longitudinal axis 26, steerable vehicle wheels (not shown) are turned, as is known in the art.

The support 24 (FIG. 3) has a main body 30 with a passage 32 through which the steering column member 12 extends. The main body 30 is made from casting and may have any desired shape. The passage 32 is partially defined by a cylindrical portion 34 of the main body 30. A tube 36 is press fit on the cylindrical portion 34. A pair of bearings 40 support the steering column member 12 for rotation relative to the support 24.

A mounting bracket 50 connects the steering column 10 with a vehicle frame. The mounting bracket 50 has a rear wall 52 with openings 54 for receiving fasteners to connect the mounting bracket to the vehicle frame. The mounting bracket 50 is connected to the vehicle frame using fasteners, such as bolts, as is known in the art.

A pair of side walls 60 and 62 (FIG. 3) extend from the rear wall 52 of the mounting bracket 50. The side walls 60 and 62 extend generally perpendicular to the rear wall 52 and parallel to each other. The side wall 60 has a slot 66. The side wall 62 has a slot 68 extending generally parallel to the slot 66.

A pivot shaft 74 pivotally connects the support 24 with the mounting bracket 50. The pivot shaft 74 extends through an opening 76 in the main body 30 of the support 24. The pivot shaft 74 also extends through the slots 66 and 68 (FIGS. 1 and 2) in the side walls 60 and 62. The pivot shaft 74 is movable along the slots 66 and 68 relative to the mounting bracket 50.

A locking mechanism 82 locks the support 24 in any one of a plurality of pivot positions relative to the mounting bracket 50. The locking mechanism 82 also locks the pivot shaft 74 in any one of a plurality of positions along the slots 66 and 68 relative to the mounting bracket 50. The locking mechanism 82 (FIG. 3) includes a locking shaft or bolt 84 which extends through an arcuate slot 86 in the main body 30 of the support 24. The bolt 84 also extends through the slots 66 and 68 (FIGS. 1 and 2) in the side walls 60 and 62 of the mounting bracket 50.

The locking mechanism 82 includes a nut 90 which is threaded onto the bolt 84. A handle 92 extends from the nut 90. The handle 92 is movable by an occupant of the vehicle to unlock the locking mechanism 82. The bolt 84 (FIG. 3) extends through a pair of washers 96 which engage the side walls 60 and 62 of the mounting bracket 50. The locking mechanism 82 presses the side walls 60 and 62 toward each other and against the support 24 to prevent movement of the support and pivot shaft 74 relative to the mounting bracket 50.

Although the locking mechanism 82 is shown as a bolt 84 with a nut 90, it is contemplated that the locking mechanism may have a different construction. The locking mechanism may have any construction that presses the side walls 60 and 62 against the support 24 with sufficient force to prevent movement of the support relative to the mounting bracket 50.

Upon pivoting the handle 92 in a counterclockwise direction, as viewed in FIG. 1, the nut 90 is partially unscrewed from the bolt 84. When the nut 90 is unscrewed from the bolt 84, the support 24 may be pivoted about the pivot shaft 74 relative to the mounting bracket 50 and the pivot shaft 74 can be moved along the slots 66 and 68 in the side walls 60 and 62 of the mounting bracket.

Figure 3:
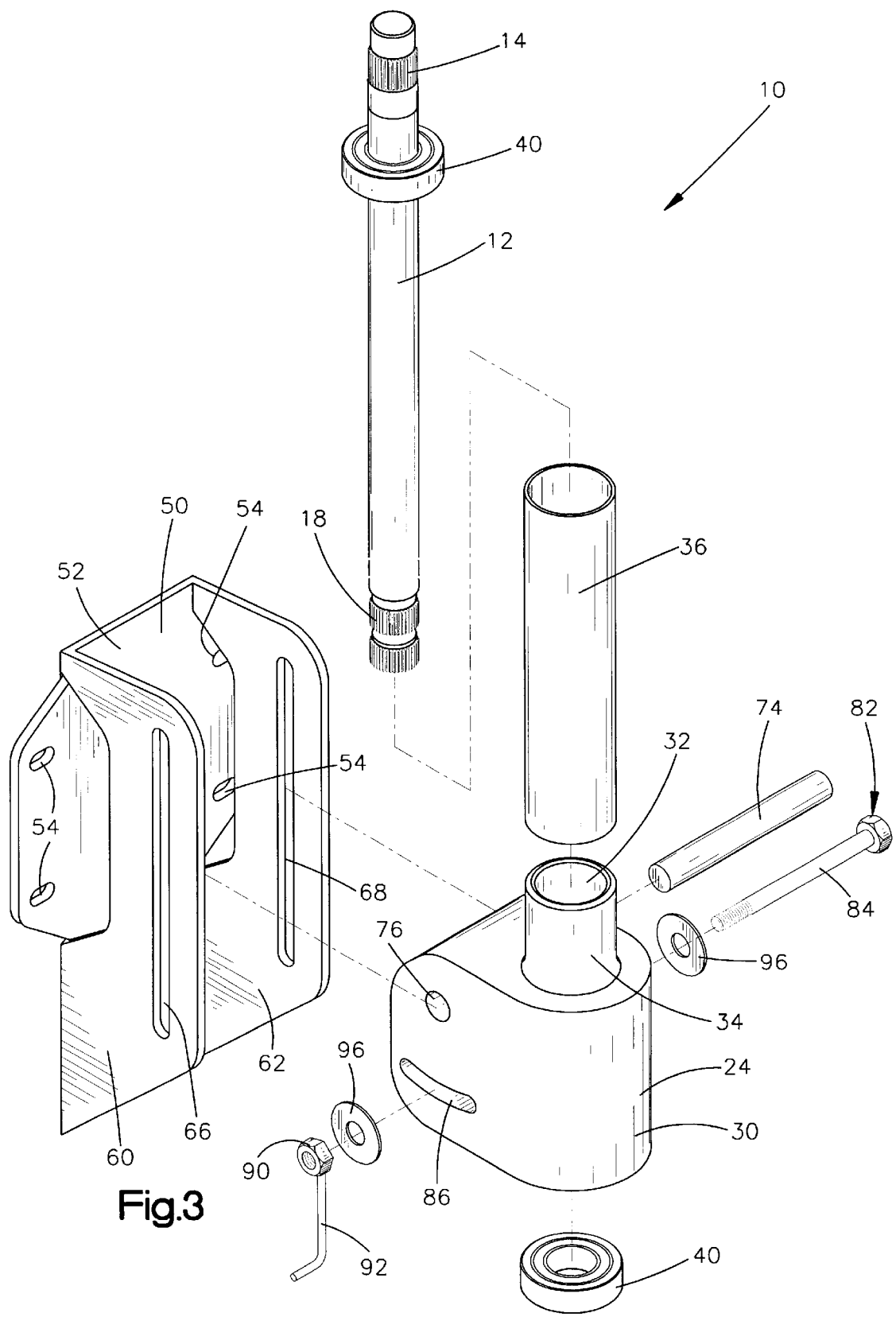
FIG. 3 is an exploded view of the steering column of FIG. 1.

The pivot shaft 74 engages upper ends, as viewed in FIGS. 1 and 3, of the slots 66 and 68 to limit upward movement of the support 24 relative to the mounting bracket 50. The bolt 84 engages lower ends of the slots 66 and 68 to limit downward movement of the support 24 relative to the mounting bracket 50. The bolt 84 engages opposite ends of the arcuate opening 86 in the support 24 to limit pivotal movement of the support relative to the mounting bracket.

After the support 24 is positioned relative to the mounting bracket 50, the handle 92 is rotated in a clockwise direction, as viewed in FIG. 1, to cause the nut 90 to be screwed onto the bolt 84. As the nut 90 is screwed onto the bolt 84, the side walls 60 and 62 are pressed towards each other and towards the support 24. The support 24 is clamped between the side walls 60 and 62 to prevent movement of the support relative to the mounting bracket 50.

From the above description of the invention, those skilled in the art will perceive improvements, changes and modifications. Such improvements, changes and modifications within the skill of the art are intended to be covered by the appended claims.

Having described the invention, the following is claimed:

1. A steering column comprising:

a steering column member connectable with a steering wheel and rotatable to turn steerable vehicle wheels;

a support for supporting said steering column member for rotation about a longitudinal axis of said steering column member;

a mounting bracket for connecting said steering column with a vehicle frame, said mounting bracket having first and second side walls extending generally parallel to each other, said first side wall having a first slot and said second side wall having a second slot extending generally parallel to said first slot;

a pivot shaft pivotally connecting said support with said mounting bracket, said pivot shaft extending through said support and said first and second slots in said first and second side walls of said mounting bracket, said pivot shaft being movable along said first and second slots relative to said mounting bracket;

a locking mechanism for locking said support in any one of a plurality of pivot positions relative to said mounting bracket and for locking said pivot shaft in any one of a plurality of positions along said first and second slots relative to said mounting bracket, said locking mechanism having a locking shaft extending through said support and said first and second slots in said first and second side walls of said mounting bracket said locking shaft being spaced from said pivot shaft.

2. A steering column as defined in claim 1 wherein said locking shaft is engageable with a first end of each of said first and second slots to limit movement of said pivot shaft in a first direction relative to said mounting bracket, said pivot shaft being engageable with a second end of each of said first and second slots to limit movement of said pivot shaft in a second direction opposite said first direction.

3. A steering column as defined in claim 1 wherein said locking mechanism presses said first and second side walls of said mounting bracket toward each other and against said support to lock said support in any one of the plurality of pivot positions relative to said mounting bracket and to lock said pivot shaft in any one of the plurality of positions along said first and second slots.

4. A steering column as defined in claim 1 wherein said support includes an arcuate opening through which said locking shaft extends.

5. A steering column as defined in claim 1 wherein said support includes a main body and a tube circumscribing said steering column member, said tube being press fit onto said main body portion.

6. A steering column as defined in claim 5 wherein said main body of said support is made by casting.

\* \* \* \* \*